July 9, 1940.   H. W. SEMAR   2,207,270
APPARATUS FOR DETERMINING STRESSES IN PIPING ARRANGEMENTS
Filed May 11, 1938   2 Sheets-Sheet 1
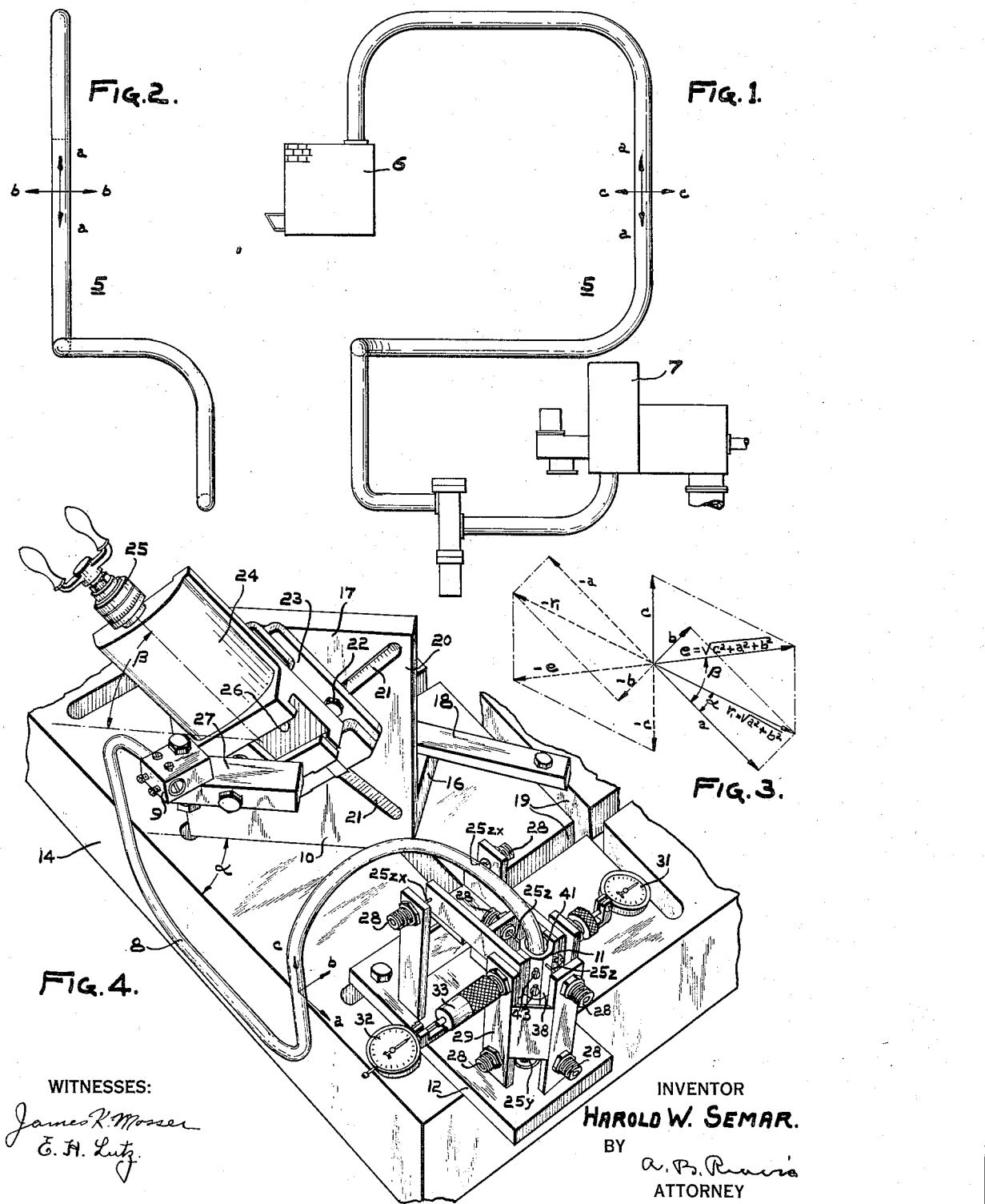
WITNESSES:
James R. Mosser
E. H. Lutz
INVENTOR
HAROLD W. SEMAR.
BY
A. B. Rearis
ATTORNEY July 9, 1940.    H. W. SEMAR    2,207,270
APPARATUS FOR DETERMINING STRESSES IN PIPING ARRANGEMENTS
Filed May 11, 1938    2 Sheets-Sheet 2
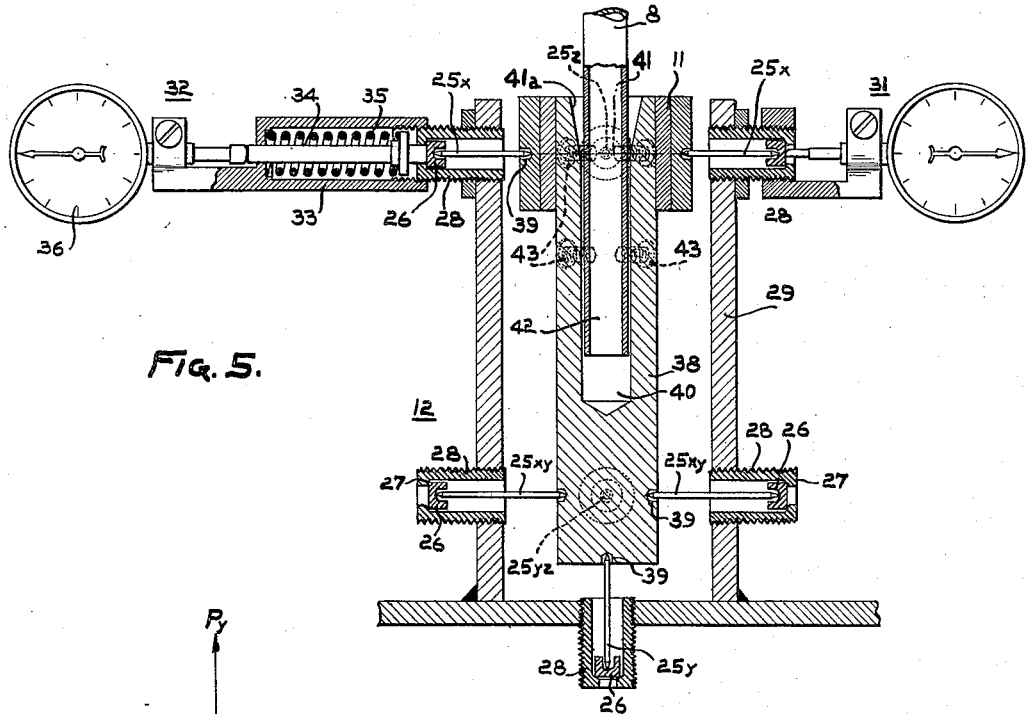
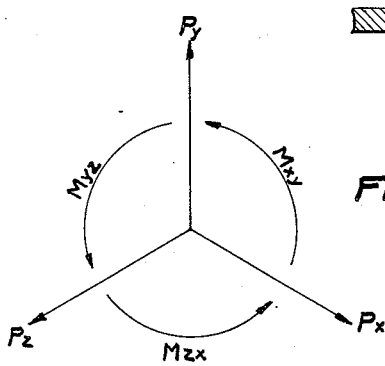
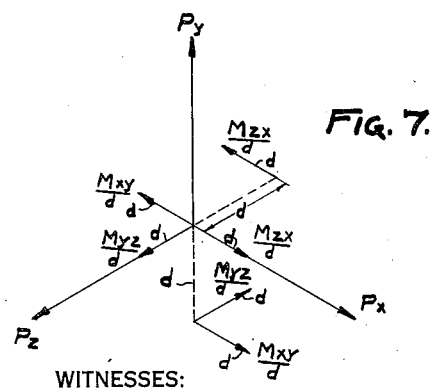
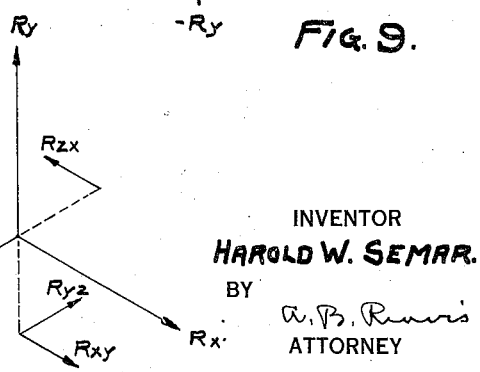
INVENTOR
HAROLD W. SEMAR.
BY
ATTORNEY Patented July 9, 1940

2,207,270

UNITED STATES PATENT OFFICE 2,207,270

APPARATUS FOR DETERMINING STRESSES IN PIPING ARRANGEMENTS

Harold W. Semar, Springfield, Pa., assignor to Westinghouse Electric & Manufacturing Company, East Pittsburgh, Pa., a corporation of Pennsylvania Application May 11, 1938, Serial No. 207,413

6 Claims. (Cl. 73—51)

My invention relates to the design or construction of piping and it has for an object to provide an apparatus for readily determining pipe stresses and reactions of a pipe on its supporting structure that are set up by expansion due to heating.

In connecting a boiler to a steam turbine, consideration must be given to the design of piping to avoid excessive forces being imposed on the turbine structure and tending to cause distortion of the latter, misalignment of the turbine and driven machine or dangerous stresses in the turbine mounting. Also, the bending moments in the pipe must not be so large as to cause leakage at the joints or dangerous stresses in the pipe walls. These forces and stresses, unless taken into account, may be unduly large where dealing with high pressures and temperatures and where the physical dimensions of the piping are large. For example, piping of this character may be of the order of 12 to 14 inches in diameter, having wall thickness of 1 inch or more, and being subjected to a temperature of 900° F. and a pressure of 1200 lbs.

There exist methods of determining pipe reactions by calculations and these are used at the present time. Where the pipe lies in more than one plane, which is frequently the case, the calculation becomes long and tedious and requires very careful checking. In accordance with the present invention, a scale model of the piping is prepared and tested on apparatus so as to provide a reliable and more workable apparatus of solving three-dimensional pipe problems, the apparatus involving fixed and movable clamps for the ends of the model pipe with means providing for movement of the movable clamp to produce strain in the model in the direction of the strain caused by expansion and means for measuring the reacting forces on the fixed clamp in consequence of the strain. The strain in the pipe caused by expansion is equal to the expansion but in the opposite direction. Knowing these forces and the scale of the model, the forces or reactions of the main piping under similar strain may be readily determined.

A further object of my invention is to provide apparatus for determining reactions of three-dimensional piping wherein a scale model of the piping is prepared, one end of the piping being fixed and the other end being movable or adjustable in the direction of expansion, the reactions of the fixed end being observed as the movable end is adjusted.

These and other objects are effected by my invention as will be apparent from the following description and claims taken in connection with the accompanying drawings, forming a part of this application, in which:

Figs. 1 and 2 are diagrammatic views of three-dimensional piping connecting a solidly supported manifold and a turbine, Fig. 2 being taken at right angles to Fig. 1;

Fig. 3 is a diagram of expansions of the piping shown in Figs. 1 and 2;

Fig. 4 is an isometric view of the testing apparatus with a scale model of three-dimensional piping, corresponding to Figs. 1 and 2, and having its ends clamped or fixedly secured to fixed and movable supports;

Fig. 5 is a sectional view, drawn along a larger scale of the fixed support of Fig. 4; and Figs. 6, 7, 8, and 9 are diagrammatic views explanatory of principles of operation involved.

In Figs. 1 and 2, there are shown two views of three-dimensional piping, at 5, for connecting any suitable anchor point 6 to the turbine 7. Representing the coordinate directions of expansion and end movement by $a$, $b$, and $c$, Figs. 3 and 4, then, considering $a$ and $b$, the resultant, $$r_1 = \sqrt{a^2 + b^2}$$

defines the angle $\alpha$ with respect to $a$; and, considering $c$ and the resultant $r$, the second resultant, $e = \sqrt{c^2 + a^2 + b^2}$, defines the angle $\beta$ with respect to the plane of $a$ and $b$, the direction of $e$ being the direction of pipe expansion and end movement. The vector $e$ represents the displacement of the pipe end with respect to its support that would take place under expansion and end movement if the pipe end and its support are considered to be disconnected, in which case, to reconnect the pipe end to its support, the pipe must be strained in an amount represented by the vector equal but in the opposite direction to $e$. Vectors $a$, $b$, and $c$, representing the expansion in three coordinate directions, the resultants $r_1$ and $e$, and the angles $\alpha$ and $\beta$ are evident from Fig. 3.

In Fig. 4, 8 represents a scale model of the piping shown in Figs. 1 and 2, the directions of expansion $a$, $b$, and $c$, the angles $\alpha$ and $\beta$, and the resultants $r_1$ and $e$ being applied thereto. One end of the pipe 8 is fixedly secured to the clamp 9 of the movable support, at 10, and the other end is secured to the clamp 11 of the fixed support, at 12, the supports being carried by a suitable base or bedplate 14.

With this arrangement, the ends of the model piping are clamped so that they cannot rotate and one end thereof is moved in the direction of expansion, the reactions occurring in consequence of movement of such end being determined at the fixed end. The support, at 10, is arranged so that the end of the pipe carried by the clamp 9 may be moved in the direction of expansion, or of the resultant $e$.

The support, at 12, is fixedly connected to the bedplate 14; and the support, at 10, is adjustably connected thereto by any suitable means, for example, by having the base 16 of the angle bracket 17 connected by the clamps 18 and grooves 19 formed in the bedplate. The bracket has a vertical flange 20 with slots 21 receiving bolts 22 securing the guide member 23 thereto and a slide 24 is adjusted along the guide member by screw mechanism, at 25. The slide has a transverse groove 26 along which may be adjustably secured the block 27 to which the clamp 9 is connected. With this arrangement, not only may the angle bracket 17 be secured to the bedplate 16 and adjustments of associated structure be made to suit the dimensions and configuration of the model pipe, but such bracket may be set so that the vertical flange thereof defines the angle $\alpha$ with respect to one edge of the bedplate, the piping being arranged so that one direction thereof is parallel to said edge, and adjustments are made so that the direction of feed of the slide 24 corresponds to the resultant, $e$, the slide defining the angle $\beta$ with respect to the plane of the bedplate. Accordingly, with suitable adjustments of the supporting construction for the movable clamp and securing the ends of the model pipe to the clamps so that they cannot rotate, one end of the model pipe may be moved, by adjustment of the slide 24, in the direction of pipe expansion.

The feed mechanism, at 25, is operated so that the movable end of the pipe is moved incrementally and the reactions at the support, at 12, for the fixed end are determined in relation to the model pipe deflections so secured.

Before considering in detail the fixed support, at 12, a preliminary explanation of certain principles involved will make the apparatus and its operation clearer. The reaction of the fixed end of the pipe can be defined by a force in each of three coordinate directions and a moment in each of the three coordinate planes. The three moments are present because the end of the pipe is restrained from rotation in any direction. These six coordinate forces are shown in Fig. 6 by the forces $P_x$, $P_y$, $P_z$ and by the moments $M_{xy}$, $M_{yz}$, $M_{zx}$ in the $xy$, $yz$ and $zx$ planes, respectively. Each of the three moments can be replaced by a couple, one force of which acts in a coordinate direction. For instance, in Fig. 7, the moment $M_{xy}$ is replaced by two forces in opposite directions of $$\frac{M_{xy}}{d}$$

magnitude and a distance $d$ apart, one of which is in the direction of $P_x$. By similarly replacing the other two moments by couples, the six equivalent forces of Fig. 7 result. The six coordinate forces are readily converted to the six equivalent forces (Fig. 8) by the following relations:

$$R_x = P_x - \frac{M_{xy}}{d} + \frac{M_{zx}}{d}$$

$$R_y = P_y$$

$$R_z = P_z + \frac{M_{yz}}{d}$$

$$R_{xy} = \frac{M_{xy}}{d}$$

$$R_{yz} = \frac{M_{yz}}{d}$$

$$R_{zx} = \frac{M_{zx}}{d}$$

which are evident from the consideration of Figs. 7 and 8.

Conversely, if the equivalent forces of Fig. 8 are known, the coordinate forces can be found from the following relations:

$$P_x = R_x + R_{xy} - R_{zx}$$
$$P_y = R_y$$
$$P_z = R_z - R_{yz}$$
$$M_{xy} = dR_{xy}$$
$$M_{yz} = dR_{yz}$$
$$M_{zx} = dR_{zx}$$

The clamp 11 for the fixed end of the pipe 8 is supported so that each of the six equivalent forces can be measured. Accordingly, as may be seen from Figs. 4, 5, and 9, the clamp 11 is held in place by pins or struts acting in the positive and negative directions of the six equivalent forces.

In Fig. 9, the forces $R_x$ and $-R_x$ represent the location of one pair of pins $25_x$ of Figs. 4 and 5, the pair of forces $R_{xy}$ and $-R_{xy}$ the location of the pair of pins $25_{xy}$, the forces $R_z$ and $-R_z$ the location of the pair of pins $25_z$, the forces $R_{yz}$ and $-R_{yz}$ the pair of pins $25_{yz}$, the force $-R_y$ the pin $25_y$, and the forces $R_{zx}$ and $-R_{zx}$ the pins $25_{zx}$, the pins being supported as shown in Fig. 5.

Each pin or strut rests on a button 26 bearing against the shoulder 27 of the sleeve 28 threaded to the outer member 29 of the fixed support, at 12. The sleeves 28 are adjusted to allow a very small movement, for example, about .002 of an inch, so that one pin of a pair transmits the force to the outer member of the support while the other is slack. As shown, the pin which would correspond to $+R_y$ in Fig. 9 is omitted to allow for connection of one end of the model pipe to the inner member or clamp 11 of the fixed support, at 12; and, with this arrangement, wherein the clamp is in the form of a socket with an open upper end for the model pipe, the model piping must be mounted so that $R_y$ remains negative.

Forces from the clamp 11 are transmitted to the outer member 29 of the fixed support, at 12, by the struts or pins represented by the reference characters 25 with appropriate subscripts, and the force to which a given pin is subjected is that required just to lift its button from its seat. Measurement of forces is accomplished with the weighing instruments, at 31 and 32, shown on Fig. 5 in connection with the pins or struts $25_x$.

The instrument, at 31, is a dial indicator which bears on the button supporting the slack pin and it serves to show when the opposite button is moved and to check the clearance between the pins.

The instrument, at 32, has a body 33 carrying the plunger 34 and containing the calibrated spring 35, one end of the body being internally threaded to engage the external threads of the sleeve 28. The plunger 34 bears on a button 26 with an increasing force as the instrument is screwed onto the sleeve to compress the spring 35 until the indicator, at 31, associated with the opposed pin or strut of the pair shows that the button has been lifted. In this way, the force acting on the left-hand pin or strut $25_x$ in Fig. 5 may be determined by the compression of the spring 35, the reading of the indicator 36 showing the magnitude of the force.

The six forces are noted for several positions of the movable end of the model pipe. These forces are plotted against the linear movement of one end of the pipe with respect to the other, or pipe deflection, effected by means of the movable support, at 10, and the average slopes of the curves thereof are taken as the model deflection constants $R_x$, $R_y$, $R_z$, $R_{xy}$, $R_{yx}$ and $R_{zx}$, which are forces per unit deflection. The deflection is assumed as positive in the direction opposite to that of the pipe expansion and care must be taken of the signs of the model deflection constants.

If the model 8 were exactly to scale and of the same material as the full size pipe, the forces of the full size pipe would simply equal the model forces divided by the scale of the model; however, it is usually convenient to make the model only of standard sizes of steel tubing and to depart somewhat from a true scale model. The model forces can still be readily transferred to the full size forces if the factor, $$\lambda = \frac{tR}{r^2}$$

where $t$ = wall thickness
$R$ = radius of pipe bend
$r$ = mean radius of pipe, which is the index of the increased flexibility of the bends due to the collapsing of the pipe section, is kept the same. This can be done by selecting a standard size of steel tubing having approximately the same ratio of wall thickness to diameter, and then taking a length to give the same value of $\lambda$. Denoting the model and full size pipe dimensions by the subscripts $m$ and $a$, respectively, this condition will be met if the scale be taken as:

$$S = \frac{R_m}{R_a} = \left(\frac{r_m}{r_a}\right)^2 \frac{t_a}{t_m}$$

Then, for the same deflection, the forces in the full-size pipe and the model will be in the ratio of $$\frac{E_a I_a}{E_m I_m} S^3 = K$$

and the moments in the ratio of $$\frac{E_a I_a}{E_m I_m} S^2 = K$$

where $E_a$ = modulus of elasticity—actual pipe
$I_a$ = moment of inertia—actual pipe section
$E_m$ = modulus of elasticity—model
$I_m$ = moment of inertia—model section
$S$ = scale of model The actual force or moments exerted by the full size pipe are then $$P_x = (R_x + R_{xy} - R_{zx})Ke$$
$$P_y = R_y Ke$$
$$P_z = (R_z - R_{yz})Ke$$

$$M_{xy} = \frac{d}{S} R_{xy} Ke$$

$$M_{zz} = \frac{d}{S} R_{zz} Ke$$

Where $e$ is the linear expansion or combination of expansion and end movement of the full size pipe and $K$ is a constant and function of pipe dimensions, the quantity $e$ being the vector sum of the expansion and end movements in the coordinate directions and corresponding to the movement given to the clamp 9 by means of the feed mechanism, at 25.

From the foregoing, it will be apparent that I have devised apparatus for readily determining reactions produced in three-dimensional piping by expansion, this being done by providing a scale model of the piping and subjecting it to test in the manner and with the apparatus already described, one end of the model piping being clamped to the fixed support, at 12, and the other end being clamped to the movable support, at 10. As already pointed out, the movable support may be adjusted translatorially to suit the dimensions of the model and angularly in any direction so that the end of the pipe attached thereto may be caused to move in the direction of pipe expansion.

Referring further to the fixed clamp 11, this element is preferably comprised by a vertically disposed body 38 having openings 39 providing seats for the various struts or pins and having a vertical bore 40 open at its upper end to receive one end of the pipe, the bore being chamfered, at 41a, not only to facilitate insertion of a pipe end, but also to assure that the end of the pipe, indicated at the transverse plane 41 in Fig. 5, may be arranged in the plane of the struts or pins 25x and 25z, the model of the piping being extended beyond the plane 41, as shown at 42, to provide a portion for insertion in the socket 40 and with which set screws 43 carried by the body 38 may cooperate to firmly connect the pipe end to the body. In this connection, the uppermost set screws are effective in said plane 41, whereby it is assured that the end of the model pipe corresponding to the end of the full-size pipe may correspond thereto and be subject to similar conditions and physical effects.

Assuming that a test model of the piping is fixed to the supports with proper location and adjustment of the movable support, at 10, the feed mechanism, at 25, of the latter is operated to move, in an incremental manner, the adjacent end of the model pipe in the direction of pipe expansion. For each increment of movement, observations of forces or reactions at the fixed support are made by means of the indicators, at 31 and 32, which are attached to the sleeves 28; and, as already pointed out from this series of observations related to linear movements of the movable pipe end, or pipe deflections, average slopes are taken as model deflection constants for the various points, these being functions per unit deflection. If the model is exactly to the scale and of the same material as the full-size pipe, the forces on the latter would equal the model constant divided by the scale; however, as it is frequently more convenient to make the model of standard size of steel tubing and depart somewhat from a true scale model, correction factors may be introduced, as hereinbefore pointed out, to make the model useful for this purpose.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In apparatus for testing a scale model of three-dimensional piping comprising a bedplate, a fixed support secured to the bedplate and including a clamp for one end of the model pipe, a movable support adjustably connected to the bedplate and including a clamp for the other end of the pipe, means providing for adjustment of the movable support so that its clamp may be moved in the direction of pipe expansion, and means associated with at least one of the clamps and providing for the determination of forces resisting relative movement of the ends of the model pipe along three coordinate axes and the forces resisting rotation about such axes.

2. In apparatus for determining reactions of three-dimensional piping by the use of a model of the piping, a fixed clamp for one end of the model piping, a movable clamp for the other end of the model piping, means providing for movement of the movable clamp in the direction of pipe expansion to deflect the model, and means providing for the determination of forces resisting translatory and angular movements of the fixed clamp when the model piping is deflected.

3. In apparatus for determining reactions of three-dimensional piping by the use of a model of the piping, a fixed clamp for one end of the model, a movable clamp for the other end of the model, means providing for movement of the movable clamp in the direction of pipe expansion to deflect the model, and means providing for the determination of forces restraining the fixed clamp from movement along three coordinate axes and of forces resisting angular movement of such clamp with respect to said axes.

4. In apparatus for determining reactions of three-dimensional piping by the use of a model of the piping, a fixed clamp for one end of the model, a movable clamp for the other end of the model, means providing for movement of the movable clamp in the direction of pipe expansion to deflect the model, a radial arm attached to the fixed clamp, a bracket, first struts carried by the bracket and resisting translatory movement of the fixed clamp with respect to three coordinate axes, second struts carried by the bracket and cooperating with said arm and the fixed clamp to resist angular movement of the latter with respect to said axes, and means providing for the determination of strut reactions.

5. In apparatus for determining reactions of three-dimensional piping by the use of a model of the piping, a bedplate, a fixed clamp for one end of the model and carried by the bedplate, a movable clamp for the other end of the model, a bracket, means providing for translatory and angular adjustment of the bracket with respect to the bedplate and for fixedly securing it in adjusted position, a guide carried by the bracket, means providing for angular adjustment of the guide with respect to the bracket, a slide movable along the guide and carrying said movable clamp, means for moving the slide, and means providing for the determination of restraining forces acting on the fixed clamp when the model is deflected in consequence of movement of said slide.

6. In apparatus for determining reactions of three-dimensional piping by the use of a model of the piping, a bedplate, a fixed clamp for one end of the model and carried by the bedplate, a movable clamp for the other end of the model, a bracket, means providing for translator and angular adjustment of the bracket with respect to the bedplate and for fixedly securing it in adjusted position, a guide carried by the bracket, means providing for angular adjustment of the guide with respect to the bracket, a slide movable along the guide and carrying said movable clamp, means for moving the slide, a radial arm attached to the fixed clamp, a second bracket attached to the bedplate, first struts carried by the second bracket and resisting translatory movement of the fixed clamp with respect to three coordinate axes, second struts carried by the second bracket and cooperating with said arm and the fixed clamp to resist angular movement of the latter with respect to said axes, and means providing for the determination of strut reactions.

HAROLD W. SEMAR.